United States Patent [19]

Uchidoi et al.

[11] 4,247,186
[45] Jan. 27, 1981

[54] PHOTOMETRIC CIRCUIT FOR CAMERA

[75] Inventors: Masanori Uchidoi, Yokohama; Hiroshi Aizawa, Kawasaki; Kazunobu Urushibara, Yokohama; Nobuyuki Suzuki; Masami Shimizu, both of Tokyo, all of Japan

[73] Assignee: Canon Kabushiki Kaisha, Tokyo, Japan

[21] Appl. No.: 50,124

[22] Filed: Jun. 19, 1979

[30] Foreign Application Priority Data

Jun. 27, 1978 [JP] Japan ............................ 53-88401[U]

[51] Int. Cl.$^3$ .............................................. G03B 7/083
[52] U.S. Cl. ................... 354/24; 354/60 R; 356/223
[58] Field of Search ................. 354/24, 50, 51, 60 R; 356/223

[56] References Cited

U.S. PATENT DOCUMENTS

| 4,072,962 | 2/1978 | Maida | 354/24 |
| 4,200,374 | 4/1980 | Shimizu et al. | 354/60 R |

Primary Examiner—Michael L. Gellner
Attorney, Agent, or Firm—Toren, McGeady and Stanger

[57] ABSTRACT

A photometric circuit for a camera including a first operational amplifier with a photo-electric element connected between its inverted and non-inverted input terminals and, a logarithmic compression diode connected between the output terminal and the inverted input terminal of the first operational amplifier, thus providing a voltage corresponding to the logarithmic value of the brightness of an object to be photographed at the output terminal of the first operational amplifier. A second operational amplifier has a plurality of temperature compensating commonly polarized diodes connected in parallel between its inverted input terminal and the output terminal. A first constant voltage is applied to the non-inverted input terminal of the second operational amplifier while a second constant voltage is applied through a resistor to the inverted input terminal of the second operatonal amplifier, thereby providing temperature-compensation of the output voltage of said first operational amplifier.

7 Claims, 4 Drawing Figures

PHOTOMETRIC CIRCUIT FOR CAMERA

BACKGROUND OF THE INVENTION

1. Field of the Invention

The present invention relates to a temperature-compensated, photometric circuit for a camera.

2. Description of the Prior Art

In general an operational amplifier used in a photometric system has a photoelectric element connected between the inverted and non-inverted input terminals thereof and a logarithmic compression diode connected between the output terminal and the inverted input terminal thereof. A voltage corresponding to the logarithmic value of the brightness of an object to be photographed is produced at the output terminal of the operational amplifier.

The output voltage of the operational amplifier is expressed by the following formula:

$$\frac{kT}{q} \ln\left(\frac{ip}{is} + 1\right) \quad (1)$$

where
- ip: current flowing through the photoelectric element
- is: reverse saturation current of the logarithmic compression diode
- k: Boltzmann's constant
- T: absolute temperature
- q: elementary quantity of electron Since the reverse saturation current of the logarithmic compression diode varies as the temperature changes, the conventional photometric system includes an operational amplifier for temperature compensation connected to the non-inverted input terminal of the photometric operational amplifier, thereby compensating for the temperature change. This operational amplifier for temperature compensation has one temperature-compensating diode, similar to the logarithmic compression diode, connected between the inverted input terminal and the output terminal thereof. Constant voltage is applied to the non-inverted input terminal, while another constant voltage is applied through a resistor to the inverted input terminal.

The output voltage of this operational amplifier for temperature-compensation is expressed by the following formula:

$$Vc - \frac{kT}{q}\left(\ln \frac{iR}{is} + 1\right) \quad (2)$$

where
- Vc: constant voltage applied to the non-inverted input terminal of the operational amplifier
- iR: current flowing through the resistor connected to the inverted input terminal of the operational amplifier
- is: current flowing through the temperature-compensation diode The output voltage E of the temperature-compensated, photometric operational amplifier is expressed by [formula (1)+formula (2)]. In these formulae, ip/is≫1, iR/is≫1, and consequently 1 in these formulae is omitted.

Thus, $$\begin{aligned}
E &= Vc - \frac{kT}{q} \ln \frac{iR}{is} + \frac{kT}{q} \ln \frac{ip}{is} \\
&= Vc - \frac{kT}{q}\left(\ln \frac{iR}{is} - \ln \frac{ip}{is}\right) \\
&= Vc - \frac{kT}{q} \ln \frac{iR}{is} \cdot \frac{is}{ip} \\
&= Vc - \frac{kT}{q} \ln \frac{iR}{ip} \\
&= Vc + \frac{kT}{q} \ln \frac{ip}{iR}
\end{aligned} \quad (3)$$

Thus, the output voltage of the photometric operational amplifier is not affected by the reverse saturation current (is) of the logarithmic compression diode which varies as the temperature changes.

It is, however, to be noted that the formula (3) still involves the absolute temperature T, so that the output voltage of the photometric operational amplifier is affected by the temperature.

It is clear from the formula (3) that if ip=iR, the output voltage of the photometric operational amplifier becomes Vc, which is not subjected to the influence of the temperature change. Thus, the selection of the value of iR relative to ip permits a determination of the extent to which the output voltage of the photometric operational amplifier is subjected to the influence of temperature change. Accordingly, when the current iR has a value corresponding to Ev at the middle of the light measuring range, the optimum condition is obtained. The brightness within the light measuring range of a camera varies, for example, from $Ev_1$ to $Ev_{18}$, and such brightness corresponds to the photoelectric current of a photoelectric element in the order of picoamperes to a current in the order of microamperes. Thus, ip in the formula (3) varies throughout a relatively wide range from a small current to a very small current. Accordingly, iR must be a very small current in order to obtain the optimum condition, with the result that the resistor connected to the inverted input terminal of the temperature-compensating operational amplifier must have a very high resistance. If a resistor having such a very high resistance is used in a camera, many troubles may occur. This is due to the fact that the higher the resistance the more leakage of current is likely to occur under the influence of humidity.

In general, a camera is used under various conditions, and if such camera employs a resistor having very high resistance there may occur large errors in photometric quantity. Accordingly, a resistor of very high resistance can not be put into practical use in a camera. Under the circumstances, it has been the practice to use, as the current iR in the formula (3), a current of the order of microamperes which corresponds to the photoelectric current of $Ev_{18}$, so that the resistance of the resistor connected to the inverted input terminal of the temperature-compensating operational amplifier may be as low as possible.

Accordingly, the output voltage E of the temperature-compensated, photometric operational amplifier varies in accordance with the formula (3), as shown in FIG. 1. In this regard it is assumed that a camera is usually used in the temperature range from −20° C. to 40° C. and that $E_1$ indicates the characteristic of the output voltage E at the intermediate temperature of 10° C., $E_2$ indicates the characteristic of the output voltage E at the temperature of −20° C. and $E_3$ indicates the characteristic of the output voltage E at the temperature of 40° C. The output voltage E is so selected that $E=Vc$ at $Ev_{18}$ and the standard point where $E=Vc$ is set at $Ev_{18}$, the limit of the light measuring range. Consequently, the output voltage E is subjected to substantial temperature dependence throughout the whole light measuring range. The influence of temperature is considerably increased as the voltage approaches $Ev_1$. Accordingly, even if the known temperature-compensation is applied to the conventional photometric circuit, it is impossible to fully compensate for the influence of temperature change.

SUMMARY OF THE INVENTION

It is an object of the present invention to avoid the above mentioned defects and to provide a photometric circuit for a camera in which a plurality of temperature compensating commonly polarized diodes are connected in parallel between the inverted input terminal and the output terminal of the temperature-compensating operational amplifier. As a result the reference point at which the output voltage of the photometric operational amplifier is not subjected to the influence of temperature change may be shifted toward the intermediate point of the light measuring range, so that the influence of temperature change is substantially decreased.

It is another object of the present invention to provide a photometric circuit for a camera in which the temperature-compensating operational amplifier has a level adjusting variable resistor connected to the inverted input terminal thereof, which is made as a moisture-proof element, so that the resistance of said variable resistor can be set to a somewhat higher value.

The other objects of the present invention become clear from the following descriptions concerning preferred embodiments of the present invention.

DESCRIPTION OF THE PREFERRED EMBODIMENT

Now, an embodiment of the present invention will be explained in detail with reference to the drawings.

Figure 2:
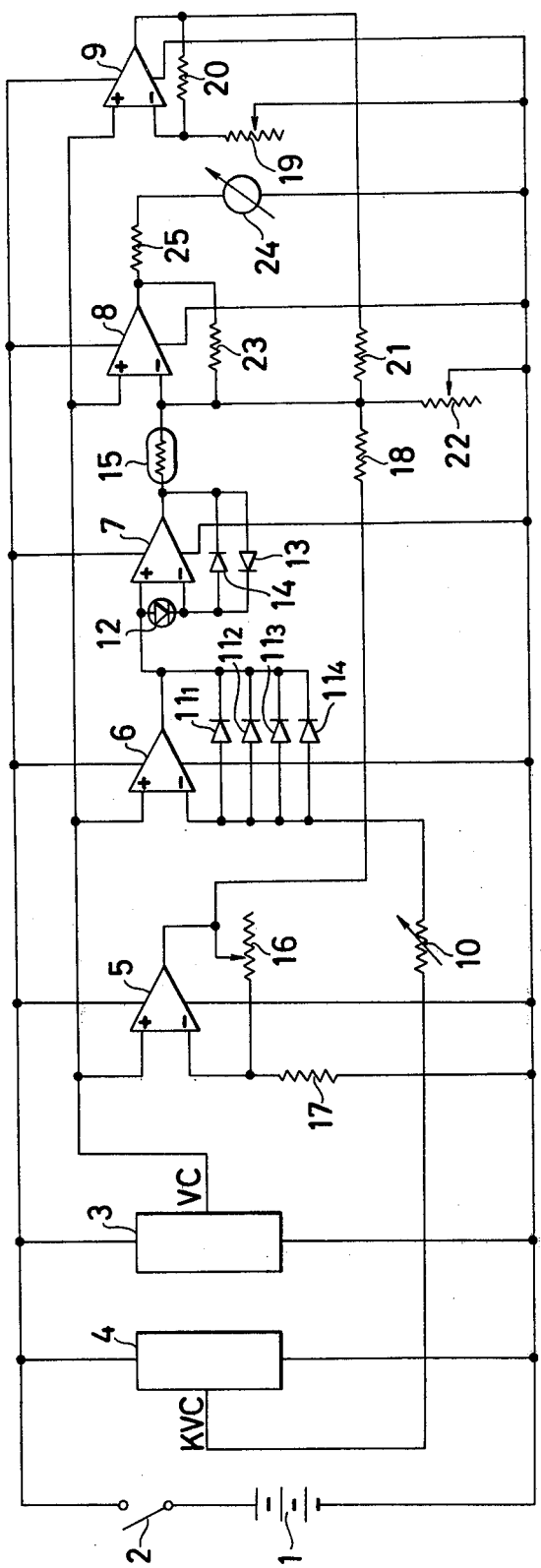
FIG. 2 is a circuit diagram of the photometric circuit according to the present invention.

FIG. 2 illustrates a photometric circuit for a camera, which includes a voltage source or a battery 1, a main switch 2 which is arranged to be closed, for example, in response to the first step of the depressing operation of a release button, first and second constant voltage generating circuits 3 and 4, respectively, which are connected, in parallel relationship, through said main switch 2 with said battery 1, and operational amplifiers 5, 6, 7, 8 and 9 which are also connected in parallel relationship through said main switch with said battery. The constant voltage generated by the first constant voltage circuit 3 is applied to non-inverted input terminals of the operational amplifiers 5, 6, 8 and 9. The second constant voltage circuit 4 generates a constant voltage KVC which is higher than the constant voltage VC generated by the first constant voltage circuit 3, and said constant voltage KVC is applied through a level adjusting variable resistor 10 to an inverted input terminal of the temperature-compensating operational amplifier 6. Four commonly polarized temperature-compensating diodes $11_1$, $11_2$, $11_3$ and $11_4$, each of which has same characteristic as that of a diode 13 for logarithmic compression which will be hereinafter described in detail, are connected between the inverted input terminal and the output terminal of said operational amplifier 6 and in parallel relationship with each other. The output of the operational amplifier 6 is applied to the non-inverted input terminal of the photometric operational amplifier 7. A photoelectric element 12, such as silicon photocell, is connected between the non-inverted and inverted input terminals of said operational amplifier. A diode 13 for logarithmic compression and a discharging diode 14 for instantaneous photometry are connected in parallel with each other between the inverted input terminal and the output terminal. A temperature-compensation resistor 15 is connected between the output terminal of the photometric operational amplifier 7 and the inverted input terminal of an information computing operational amplifier 8. The operational amplifier 5 is used to provide film sensitivity information, and a variable resistor 16 for setting the film sensitivity information is connected between the inverted input terminal and the output terminal of said operational amplifier 5, said inverted input terminal being connected through a resistor 17 to a negative side of the battery 1. The output of this operational amplifier 5 is applied through a resistor 18 to the inverted input terminal of the information computing operational amplifier 8. The operational amplifier 9 is used to provide shutter time information, and the inverted input terminal of said operational amplifier is connected to the negative side of the battery through a variable resistor 19 for setting the shutter time information. A feedback resistor 20 is connected between the output terminal and the inverted input terminal of said operational amplifier 9, and the output of this operational amplifier 9 is applied through a resistor 21 to the inverted input terminal of the information computing operational amplifier 8. The inverted input terminal of the information computing operational amplifier 8 is connected to the negative side of the battery 1 through a variable resistor 22 for opening-correction information, and a feedback resistor 23 is connected between the inverted input terminal and the output terminal of said operational amplifier. The output of the operational amplifier 8 is applied through a resistor 25 to a meter 24 for displaying an iris value.

Now, the operation of the above device will be explained. It is first assumed that the resistance of the variable resistor 10 is so selected that the current iR passing through the variable resistor becomes a constant current equal to the photoelectric current ip corresponding to $Ev_{18}$.

The resistance of the variable resistor 16 is adjusted, depending on the sensitivity of a film to be loaded in the camera, and the resistance of the variable resistor for opening-correction information is adjusted, depending on the selection of an interchangeable lens to be mounted on the camera. The resistance of the variable resistor 19 is adjusted, depending on the setting of the shutter time. When the main switch 2 is closed by the first step of the depressing operation of the release button, the voltage of the battery of the power source 1 is applied to the first and second constant voltage circuits 3 and 4 and the operational amplifiers 5, 6, 7, 8 and 9. Accordingly, the constant voltage VC from the first constant voltage circuit 3 is fed to the non-inverted input terminals of the operational amplifiers 5, 6, 8 and 9, so that the operational amplifier 5 feeds film sensitivity information, in response to the selected film sensitivity, to the inverted input terminal of the operational amplifier 8. The operational amplifier 9 feeds shutter time information, in response to the selected shutter time to the inverted input terminal of the operational amplifier 8. At the same time, the constant voltage KVC of the second constant voltage circuit 4 is applied through the variable resistor 10 to the inverted input terminal of the operational amplifier 6. Since four commonly polarized temperature-compensation diodes $11_1$, $11_2$, $11_3$ and $11_4$ are connected in parallel between the inverted input terminal and the output terminal of the operational amplifier 6, one fourth of the current iR passing through the variable resistor 10 passes through each of the diodes $11_1$, $11_2$, $11_3$ and $11_4$. Accordingly, the output voltage of the temperature-compensating operational amplifier 6 is expressed by the formula (2), as follows:

$$Vc - \frac{kT}{q} \ln(\frac{iR}{4is} + 1) \quad (4)$$

The output voltage of this operational amplifier 6 is applied to the non-inverted input terminal of the photometric operational amplifier 7. Thus, the output voltage E of the photometric operational amplifier 7 is expressed by the formulae (2) and (4), as follows:

$$E = Vc - \frac{kT}{q} \ln \frac{iR}{4is} \cdot \frac{is}{ip} \quad (5)$$
$$= Vc + \frac{kT}{q} \ln \frac{4ip}{iR}$$

In the formula (4), iR/is>>1, and therefore 1 in the formula (4) is omitted. The output voltage E of this operational amplifier 7 is applied through the temperature-compensating resistor 15 to the inverted input terminal of the operational amplifier 8. Furthermore, the opening-correction information is applied to the inverted input terminal of the operational amplifier 8 from the variable resistor 22. Accordingly, the film sensitivity information, photometric information, shutter time information and opening-correction information are supplied to the operational amplifier 8, which serves to computes this information and provides a voltage corresponding to a proper iris value. The output of this operational amplifier 8 is supplied to the meter 24, which displays the proper iris value.

Thus the proper iris value is displayed, and the output voltage E of said photometric operational amplifier 7 becomes VC when iR=4ip, as is clear from the formula (5). Since iR is set to be equal to the photoelectric current corresponding to $Ev_{18}$, E=VC when the photoelectric current ip is equal to one forth of the photoelectric current corresponding to $Ev_{18}$, and consequently the reference point where there is no influence of temperature change is shifted to the position corresponding to $Ev_{16}$.

The electric circuit of the photometric circuit may be made as an integrated circuit and may be contained in a camera in the form of a printed circuit board. Consequently, the level adjusting variable resistor 10 connected to the inverted input terminal of the temperature-compensating operational amplifier 6 is made in the printed circuit board, and it is easy to apply moisture-proofing treatment to this variable resistor 10, for example, by applying resin or the like thereon.

If the moisture-proofing treatment is applied to the variable resistor 10, it is possible to prevent the occurrence of leakage even if the resistance of the variable resistor 10 is somewhat increased. Accordingly, it is possible to increase the resistance of the variable resistor 10 to somewhat higher values and to set the current iR in the formula (5) to the value corresponding to the photoelectric current of $Ev_{16}$.

Figure 1:
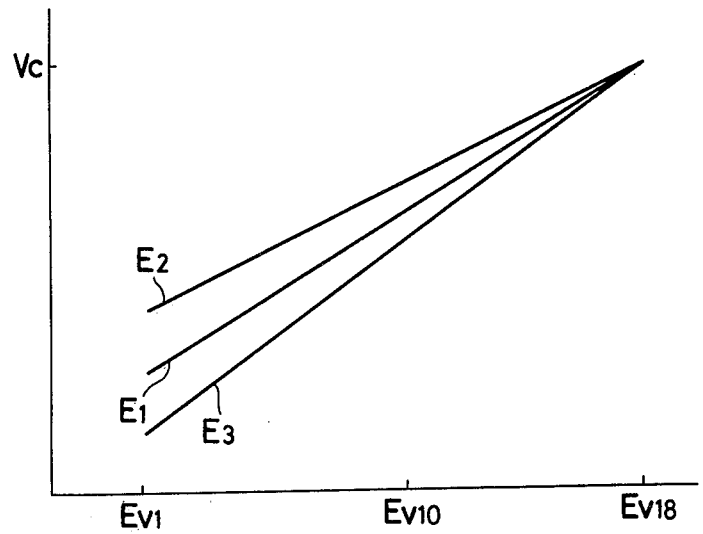
FIG. 1 is an output voltage characteristic diagram of a conventional photometric operational amplifier.
Figure 3:
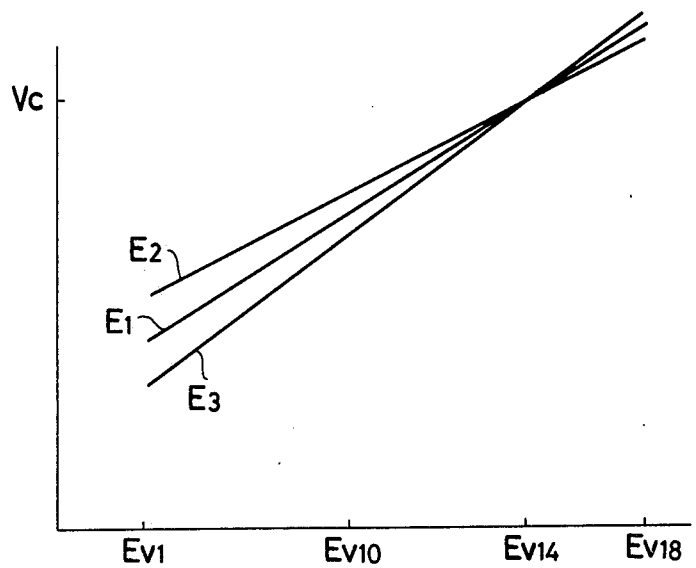
FIG. 3 is an output voltage characteristic diagram of the photometric operational amplifier as shown in FIG. 2, in which the level adjusting resistor shown in FIG. 2 is made as a moisture-proof element, so that the resistance of said resistor may be set to somewhat a higher value.

If the moisture-proofing treatment is applied to the variable resistor 10 and the resistance of the variable resistor 10 is so selected that the current iR passing through the variable resistor 10 becomes equal to the photoelectric current ip corresponding to $Ev_{16}$, the output voltage E of the photometric operational amplifier 7 becomes equal to VC when the photoelectric current ip corresponding to $Ev_{14}$ flows therethrough, as will be understood from the formula (5). At this time, the reference point where there is no temperature influence is at the position corresponding to $Ev_{14}$, as shown in FIG. 3.

The fact that the reference point is located at the position corresponding to $Ev_{14}$ and there is little temperature influence around such reference point has great importance in practical use. Referring to the frequency of use of shutter piped and iris opening combinations in photography, the more frequently used combination involves the shutter time of 1/250 sec. and the iris of about F8, corresponding to $Ev_{14}$. Such a fact means that the photometric circuit is substantially devoid of influence of temperature change at most frequently used exposure conditions in photography, that is, accurate exposure measurement can be performed in most photographic operations.

Although the embodiment including four temperature-compensation diodes $11_1$, $11_2$, $11_3$ and $11_4$ connected in parallel with one another has been thus far described, it will be understood that the present invention is not limited to such embodiment and may be embodied as well, with two or more temperature-compensating diodes connected in parallel relationship although some difference may exist in the position of the reference point.

Figure 4:
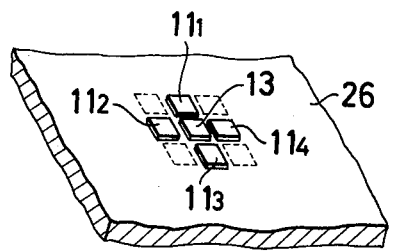
FIG. 4 shows an arrangement of the temperature-compensating diode shown in FIG. 2.

However, the temperature-compensating diodes $11_1$, $11_2$, $11_3$ and $11_4$ are usually arranged around the logarithmic compression diode 13 disposed on the printed circuit board 26, as shown in FIG. 4, so that it is convenient to use two, four or eight (as shown by dotted lines) of the temperature-compensating diodes, and the number of the temperature-compensating diodes may be determined according to the requirements in design.

It will be understood from the above detailed explanation that the present invention provides a photometric circuit in which a plurality of temperature-compensating commonly polarized diodes are connected in parallel relationship between the inverted input terminal and the output terminal of the temperature-compensating operational amplifier, whereby the reference point where the output voltage of the photometric operational amplifier is not subject to the influence of temperature change is shifted toward lower brightness side in the light measuring range, so that the output voltage of the photometric operational amplifier is not substantially affected by temperature change. Furthermore the present invention provides a photometric circuit in which the moisture-proofing treatment is applied to the level adjusting variable resistor connected to the inverted input terminal of the temperature-compensating operational amplifier, thereby permitting an increase in the resistance of the variable resistor 10 to some extent so that the current passing through the variable resistor is set to a value corresponding to the photoelectric current of $Ev_{16}$, whereby the reference point where the output voltage is not subject to the influence of temperature change can be set to the most frequently used shutter speed iris opening in photography and thus accurate measurement of exposure can be performed in most cases of photography, thereby providing a great advantage to the photographer.

What is claimed is:

1. A photometric circuit for a camera, comprising:
    a light receiving element for measuring the brightness of an object to be photographed and for producing an electrical signal corresponding to the brightness of said object;
    a photometric operational amplifier having input terminals between which said light receiving element is connected and to which an electrical signal is applied from said light receiving element;
    a logarithmic compression diode connected between an output terminal and an inverted input terminal of said photometric operational amplifier, said diode cooperating with said light receiving element to produce an electrical voltage corresponding to the logarithmic value of the brightness of the object to be photographed from said photometric operational amplifier;
    a temperature-compensating operational amplifier having an output terminal connected to a non-inverted input terminal of said photometric operational amplifier;
    a first constant voltage generating circuit for applying first constant voltage to a non-inverted input terminal of said temperature-compensating operational amplifier;
    a resistor connected to an inverted input terminal of said temperature-compensating operational amplifier;
    a second constant voltage generating circuit for applying second constant voltage through said resistor to the inverted input terminal of said temperature-compensating operational amplifier; and
    at least two commonly polarized temperature-compensation diodes connected in parallel between the inverted input terminal and the output terminal of said temperature-compensating operational amplifier, whereby the reference point where the output voltage of said photometric operational amplifier is not subject to the influence of temperature is shifted.

2. A photometric circuit for a camera according to claim 1, in which said resistor is provided with a moisture-proofing treatment whereby the resistor may be set to a somewhat higher resistance value.

3. A photometric circuit for a camera according to claim 1, in which said second constant voltage is higher than said first constant voltage.

4. A photometric circuit for a camera according to claim 1, in which each of said at least two temperature-compensation diodes has same characteristic as that of said logarithmic compression diode.

5. A photometric circuit for a camera, comprising:
    a light receiving element for measuring the brightness of an object to be photographed and producing an electrical signal corresponding to the brightness of said object;
    a photometric operational amplifier to which the electrical signal is applied from said light receiving element;
    a logarithmic compression diode connected to said photometric operational amplifier, said diode cooperating with said light receiving element to produce an electrical voltage corresponding to the logarithmic value of the brightness of the object to be photographed from said photometric operational circuit;
    a temperature-compensating operational amplifier having its output applied to said photometric operational amplifier;
    a constant voltage generating circuit for applying constant voltage to the non-inverted input terminal of said temperature-compensating operational amplifier;
    means for applying a predetermined current to the inverted input terminal of said temperature-compensating operational amplifier; and
    at least two temperature compensating commonly polarized diodes connected in parallel between the inverted input terminal and the output terminal of said temperature-compensating operational amplifier, whereby the reference point where the output voltage of said photometric operational amplifier is not subject to the influence of temperature change is shifted.

6. A photometric circuit for a camera according to claim 5, in which said means for applying a predetermined current includes a resistor connected to the inverted input terminal of said temperature-compensating operational amplifier, said resistor being subjected to moisture-proofing treatment.

7. A photometric circuit for a camera according to claim 5, in which said at least two temperature-compensating diodes are arranged around said logarithmic compression diode.

* * * * *